United States Patent [19]

Hine, II

[11] 4,170,251

[45] Oct. 9, 1979

[54] METHOD AND APPARATUS FOR DETERMINING THE WEIGHT AND MOISTURE CONTENT OF MATERIALS

[75] Inventor: Edwin W. Hine, II, Philadelphia, Pa.

[73] Assignee: Proctor & Schwartz, Inc., Philadelphia, Pa.

[21] Appl. No.: 738,638

[22] Filed: Nov. 3, 1976

[51] Int. Cl.² .............................................. B65B 1/30
[52] U.S. Cl. ......................................... 141/11; 141/83; 141/192; 34/132; 73/73; 131/22 R; 177/50
[58] Field of Search ...................... 177/50, 70; 141/11, 141/192, 83; 235/151.33; 73/73; 324/61 R; 317/246; 131/22 R, 140 R; 34/132, 136, 46, 47, 48

[56] References Cited

U.S. PATENT DOCUMENTS

| 3,372,488 | 3/1968 | Koch et al. | 34/132 |
| 3,409,025 | 11/1968 | Wochnowski | 131/22 R |
| 3,950,698 | 4/1976 | Wochnowski | 177/50 |
| 3,979,581 | 9/1976 | Reuland | 73/73 |

Primary Examiner—Houston S. Bell
Attorney, Agent, or Firm—Richard H. Thomas

[57] ABSTRACT

The present invention relates to a novel and improved apparatus for controlling or obtaining the actual weight of materials which are charged to a receptacle or other receiving means such as a shipping container. The present invention also resides in a novel apparatus for simultaneously determining the weight and moisture content of such materials.

5 Claims, 5 Drawing Figures

METHOD AND APPARATUS FOR DETERMINING THE WEIGHT AND MOISTURE CONTENT OF MATERIALS

The present invention relates to a novel and improved apparatus for controlling or obtaining the actual weight of materials which are charged to a receptacle or other receiving means, such as a shipping container. The present invention is particularly applicable to determining the actual weight of lightweight materials such as tobacco, cereals, wood pulp, dehydrated vegetables, fiberboard and chemicals, which have a certain moisture content. The present invention also resides in a novel apparatus for simultaneously determining the weight and moisture content of such materials.

The present invention will be described particularly with reference to controlling or determining the weight and moisture content of tobacco charged to a shipping container or other receptacle, although it will be apparent from the following description that the invention is equally applicable to materials other than tobacco, and has other applications; for instance, determining the weight and moisture content of materials which have been stored, or materials which are further processed.

BACKGROUND OF THE INVENTION

It is desirable in the processing of tobacco to produce a product having a moisture content within certain limits. The limits become particularly critical in the case of tobacco shipped abroad and subject to import taxation. The tobacco is contained in shipping containers and is presumed by the taxing authorities to have a specified moisture content. Should the moisture content be higher than that stated, the excess water is taxed as tobacco resulting in an unnecessary tax expense. The extra water also incurs undue shipping costs.

Thus, the tobacco industry traditionally, at least in the case of tobacco for export to certain countries, has resorted to considerable expense to produce the tobacco within closely controlled moisture content limits. This is accomplished by drying the tobacco to a high degree of dryness, cooling it and then remoistening it with steam. By way of example, for tobacco to be shipped abroad, the tobacco may be dried to as little as 6-7% moisture in order to obtain a final moisture content of about 11%.

Following the drying and remoistening steps, the tobacco is moved on a series of conveyors, one being a climbing conveyor, to the top of a packing tower where the tobacco is introduced onto a cross-conveyor which is capable of being reversed in direction to feed the tobacco into one of a pair of charging tubes. From each tube the tobacco flows into a shipping container. A hydraulic plunger is associated with each charging tube to press the tobacco into the shipping container, after which the container is capped. After filling of one of the shipping containers is completed, the cross-conveyor is reversed in direction to fill the other container.

Traditionally, the moisture content of the tobacco charged to a shipping container is measured by a moisture determining means positioned at the outlet end of the drying and remoistening apparatus. This permits the operator of the drying and remoistening apparatus to determine the moisture content of the tobacco as it comes out of the apparatus and to immediately make any corrections or adjustments in the apparatus that are necessary in order to obtain, as close as possible, the desired moisture content. While this does permit quick adjustment of the drying and remoistening apparatus, it is apparent that the moisture content in any particular shipping container can vary from that desired primarily due to drying of the tobacco between the moisture determining apparatus and the charging tubes. Thus, in order to obtain a moisture content of 11% in a particular shipping container, the tobacco may have to be remoistened to as much as 11-½%. The problem is that the rate of drying will vary dependent upon ambient temperature and humidity conditions, and an operator may unwittingly introduce into a shipping container tobacco having a moisture content above the desired 11%. In addition to resulting in excess taxes and shipping costs, too high a moisture content can cause spontaneous combustion of the tobacco and destruction of at least part of a shipment.

As a further problem, the tobacco industry traditionally has employed moisture readers which take a moisture reading only of samples of the tobacco being processed. The assumption then has to be made that the readings obtained are average readings representative of the entire product flow. Clearly, substantial variations can occur in the moisture content of the product limiting the usefulness of the sampling technique.

BRIEF SUMMARY OF THE INVENTION

These and other disadvantages are overcome by the present invention wherein there is provided a novel and improved apparatus in which a gravimetric weight reading and a moisture content reading of the material being processed are taken simultaneously at the end point of disposition of the material. In the case of tobacco for shipment abroad, the readings are taken at the point of loading of the tobacco into shipping containers, rather than at the outlet end of the drying and remoistening apparatus. If a shipping container is filled with tobacco having too high a moisture content, that tobacco can be removed from the container and can be reprocessed. The point is that the exact weight and moisture content of the tobacco in a particular container becomes known, and excess taxes are thus avoided, as well as the danger of spontaneous combustion of the tobacco.

More particularly, the present invention relates to a novel apparatus for continuously processing materials having a desired moisture content, comprising a drying and remoistening means for obtaining a desired moisture content in said materials, a receiving means remote from said drying and remoistening means, means for conveying said materials from said drying and remoistening means to said receiving means, and a weight determining means and a moisture determining means for determining the weight and moisture content of said materials, said weight and moisture determining means being adjacent said receiving means to simultaneously and continuously determine the weight and moisture content of the materials fed thereto.

As a preferred embodiment, the present invention is directed to a tobacco processing and packing apparatus comprising a drying and remoistening chamber, a packing tower including loading means for loading tobacco into shipping containers, conveyor means for transmitting tobacco from said chamber to the packing tower, said conveyor means including a weigh conveyor positioned adjacent the packing tower, loading means whereby tobacco flowing from the weigh conveyor is transmitted to the shipping containers with minimum time delay, and a moisture reading means associated with the weigh conveyor for simultaneously determining the moisture content of the tobacco on said weigh conveyor. Preferably, said moisture reading means comprises a probe which extends the full width of the tobacco layer on the weigh conveyor. In a preferred embodiment, the probe comprises at least one driving element and at least one driven element producing a stable radio frequency electrical field which passes into the layer of tobacco, the energy transferred from the driving element to the driven element varying with the product's moisture content. The driving and driven elements are parallel members which extend across the entire width of the weigh conveyor.

Also in an embodiment of the present invention, the weight determining means comprises a pivotal balance positionable in response to the weight of the material on the weigh conveyor including a weigh cell capable of producing a pneumatic signal proportional to the weight. A converter converts the pneumatic signal to an electrical signal, and a pulser produces a series of electrical pulses proportional to the electrical signal. Means are provided for counting said pulses, the total number of pulses indicating the weight of tobacco which has been moved on the weigh conveyor in a unit length of time.

It will become evident in view of the following description that the concepts of the present invention are also applicable to controlling the weight of tobacco fed to a shipping container, or to controlling the weight of materials fed to another receiving means, in addition to determining the weight and moisture content of such tobacco or materials.

BRIEF DESCRIPTION OF THE DRAWINGS

The invention and advantages thereof will become more apparent upon consideration of the following specification with reference to the accompanying drawings, in which.

Figure 1:
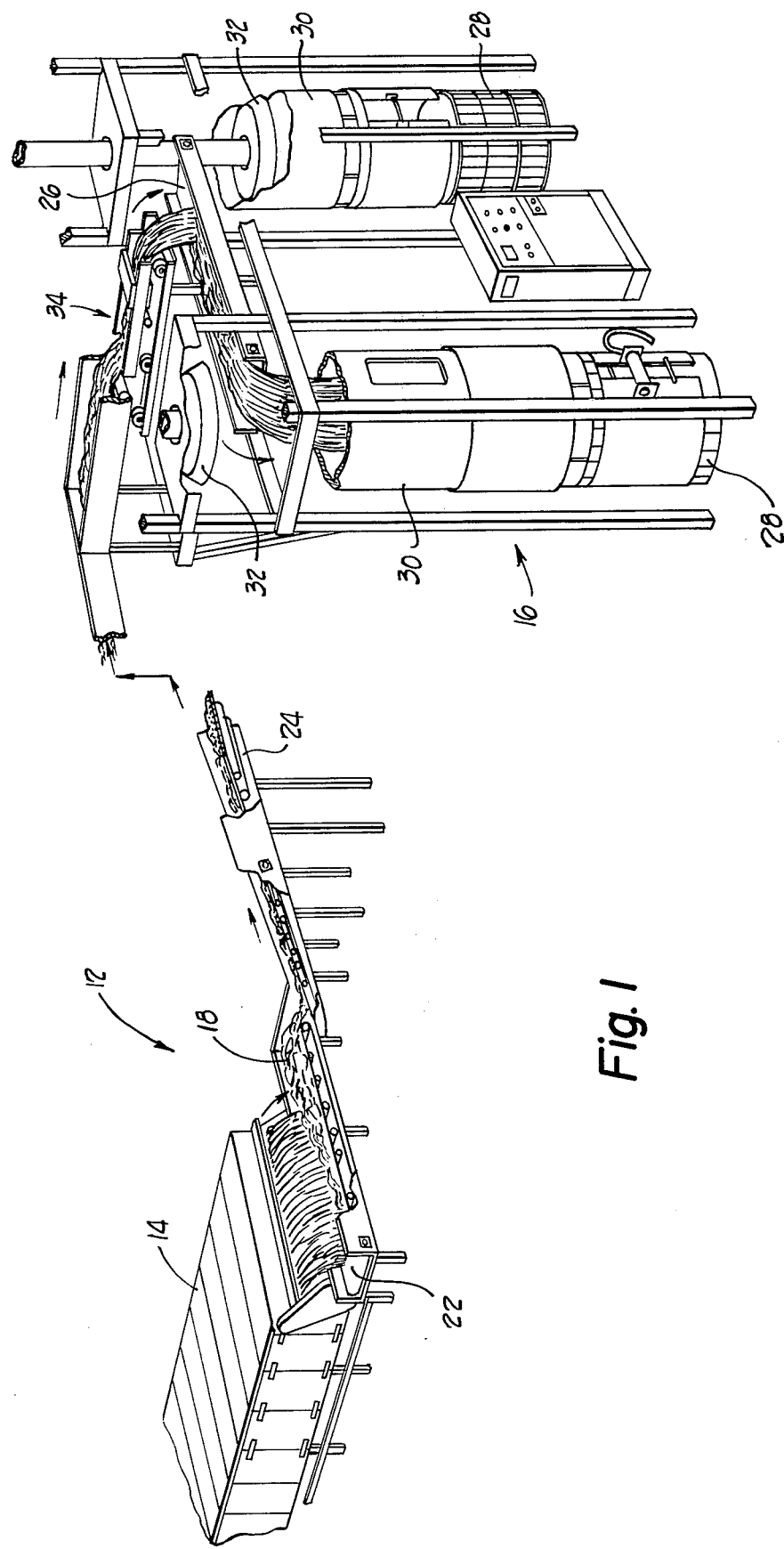
FIG. 1 is a schematic illustration of a tobacco processing apparatus and packing tower embodying the concepts of the present invention.

Referring to the drawings, and in particular FIG. 1, there is illustrated a tobacco processing apparatus 12 comprising a drying and remoistening apparatus 14 and a packing tower 16. Conventionally, the apparatus 14 is comprised of a drying section, a remoistening section, and a cooling section which is disposed between the drying and remoistening sections. For purposes of the present application, the entire apparatus 14 shall be referred to as the dryer, since its end object is to achieve a predetermined dryness or moisture content in the tobacco being processed. In the dryer 14, the tobacco is subjected to drying and then remoistening to a particular moisture content. By way of example, the tobacco may be dried to a moisture content of about 6–7% and then remoistened to a moisture content of about 11.5%.

The tobacco, identified by the numeral 18, is conveyed through the dryer on a conveyer which is not shown, from which the tobacco flows onto a horizontal cross-conveyor 22, and from there to a climbing conveyor 24 by which it is brought up to the elevation of the top of the packing tower 16. The packing tower is provided with a reversible delivery conveyor 26 which conveys the tobacco alternatively to one or the other of laterally disposed upright shipping containers 28. Each shipping container is beneath a charging tube 30, the tobacco flowing through the tubes into the containers. Above each tube is positioned an hydraulic plunger 32 adapted to compress the tobacco through the tube into each shipping container. By using a reversible delivery conveyor 26, it is apparent that while one of the containers is being loaded, the other one, as shown, can be subjected to packing and sealing.

In accordance with the concepts of the present invention, the tobacco from the climbing conveyor is transmitted to the reversible delivery conveyor past a weigh conveyor 34 which is at right angles to the delivery conveyor and is positioned at about the middle of the delivery conveyor. The weigh conveyor 34 is relatively short in length so that the tobacco which is weighed on it flows substantially immediately onto the delivery conveyor and from there into a tube for a container being packed. Thus, when a predetermined amount of tobacco has been weighed on the weigh conveyor, the delivery conveyor is reversed in direction with a controlled time delay. In this way, an accurate determination of the weight of the tobacco packed in a particular container is obtained.

Figure 2:
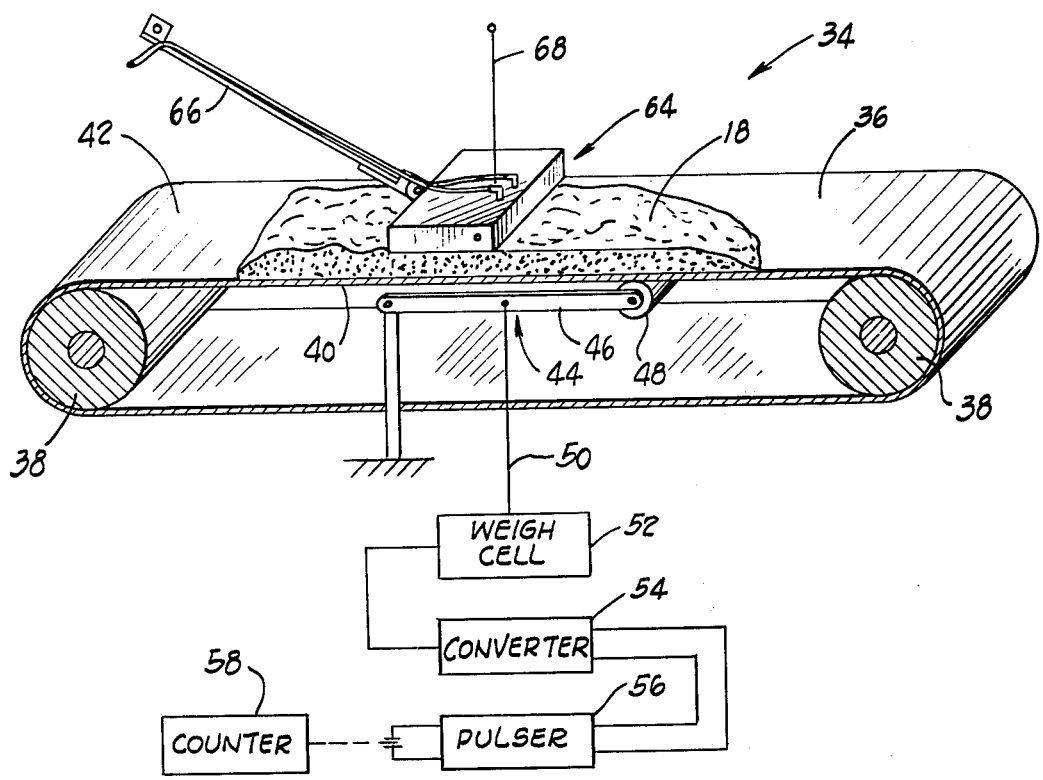
FIG. 2 is an enlarged, elevation and partial schematic view of the weight and moisture determining means of the present invention employed in the tobacco processing apparatus of FIG. 1.

Details of the weigh conveyor are shown in FIG. 2. Essentially, the conveyor is a continuous belt 36 which travels in a clockwise direction around a pair of spaced-apart end rolls 38. The upper carrying run 40 is divided into a dump area 42 on the left side of the weigh conveyor, referring to the drawing of FIG. 2, and a weigh area 44 on the right side. A pair of weigh arms 46 on opposite sides of the weigh conveyor, in about the middle of the conveyor, pivotally support a weigh roll 48 which is linked via upright posts 50 to a weigh cell 52 disposed beneath the weigh conveyor. The weigh roll support posts 50 and other linkage provide a balanced beam which has a short stroke in linear response to the weight of material conveyed on the conveyor belt carrying run.

A suitable weigh conveyor which may be employed is one manufactured by Proctor & Schwartz, Inc., identified as Model 736 Weigh Belt. It employs a weigh cell manufactured by CompuDyne Controls, Inc. This cell has two internal air chambers (not shown), one being a net weight chamber, while the other is what is called a tare chamber. Each is closed on one side by a flexible diaphragm. Compressed air is fed to the net weight chamber and bleeds to atmosphere through a nozzle. When weight or force is applied, a flapper regulates the flow of air through the nozzle. As more weight is applied, the flapper reduces the nozzle opening and air pressure in the chamber increases until a state of equilibrium is established. When the weight is reduced, the nozzle opens to reduce pressure, until equilibrium is established. By the tare chamber, the unit is calibrated to zero weight without any load.

The chamber pressure, which is proportional to weight, is transmitted to a converter 54 which converts the pressure signal to an electrical signal. A suitable converter is one manufactured by Bell and Howell, Series 18-118 Pneumatic-to-Electric Transmitter. This electrical signal which has a varying current output (voltage may be used) dependent upon the magnitude of the air signal is transmitted to a pulser 56. A suitable pulser is one sold by Acromag, Inc., identified as their Series 1320 Integrator-Totalizer. This pulser accepts a varying current input and produces a pulse output which is linearly proportional to the input. This pulse output is then sensed by a counter 58, the number of pulses being proportional to the tobacco weight on the conveyor during a unit period of time. A suitable counter is one identified as Durant Series 2000.

In a particular example in accordance with the concepts of the present invention, the weigh conveyor may be about 2½ feet in width carrying a bed of moisture-containing tobacco which is about 4 inches deep. The weigh cell produces a pressure output which varies between 3 psig and 15 psig, measuring from zero load to maximum load. The output from the converter may vary from 4 to 20 milliamps producing zero pulses at 4 milliamps and maximum pulses at 20 milliamps. At 20,000 pounds per hour of tobacco, which can be maximum flow, the pressure from the weigh cell is 15 psig producing a 20 milliamp current from the converter. This then provides 200,000 pulses per hour, equivalent to about 10 pulses per pound.

Operation of the weigh conveyor is automatic. In the case of packing of 1,000-pound containers, the flow is maintained up to 10,000 pulses or 1,000 pounds. The reversible delivery conveyor 26 is then reversed in direction to divert the flow to the second container. The time delay before reversing of the delivery conveyor 26 is such that all of the tobacco on the conveyor weighed for the first container flows to the first container.

Figure 3:
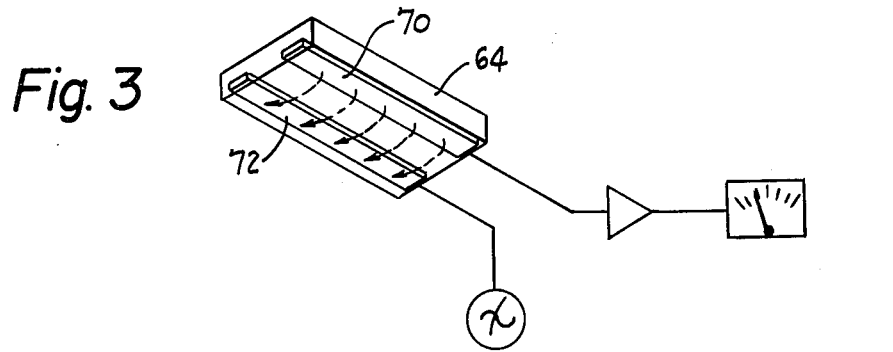
FIG. 3 is an enlarged, perspective view of the moisture sensing means employed in the tobacco processing apparatus of FIG. 1; p

Above the weigh conveyor 34, there is positioned a moisture meter 62, details of which are shown in FIG. 2. One suitable moisture meter that may be employed is that manufactured by Diversified Engineering, Inc., Model JS/2 Continuous Moisture Meter. As shown in FIGS. 2 and 3, the moisture meter is provided with a probe 64 which seats on top of the tobacco layer 18. The probe extends the entire width of the conveyor belt. It is provided with a pivot bar 66 which is adjustable to slightly raise the leading edge of the probe. The probe rests right on the layer of tobacco in contact with it, but if no material is on the conveyor, a support wire 68 holds the probe away from the conveyor carrying surface. As shown in FIG. 3, the probe is provided with a driving element 70 and a driven element 72 which are in parallel with each other and extend substantially the entire length of the probe. The elements establish an electrical field between them which extends into the tobacco layer at least three-quarters of an inch. The energy transferred from the driving element to the driven element varies with the product's moisture content. Changes in moisture content cause changes in the amounts of energy transferred from one element to the other. The coupled energy is demodulated and amplified in apparatus 74 to provide a moisture reading. This moisture reading is transmitted to a meter 76, which provides a continuous reading of the total moisture content of the tobacco introduced into a shipping container. If desired, the moisture reading can be fed in to a control instrument for automatically controlling the remoistening of the tobacco following drying. Alternatively, it can be used by the operator to control manually the remoistening step in the event of a trend or change away from that desired. Additionally, the moisture content signal can be continuously recorded on any suitable recording instrument.

Figure 4:
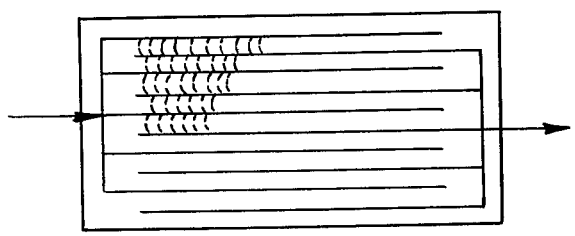
FIG. 4 is an embodiment of the moisture sensing means of FIG. 3.

Referring to FIG. 4, an alternative probe is illustrated. This probe has multiple driving and driven elements in parallel which are suitably interspersed to provide multiple electrical fields and a moisture reading of improved accuracy.

Figure 3A:
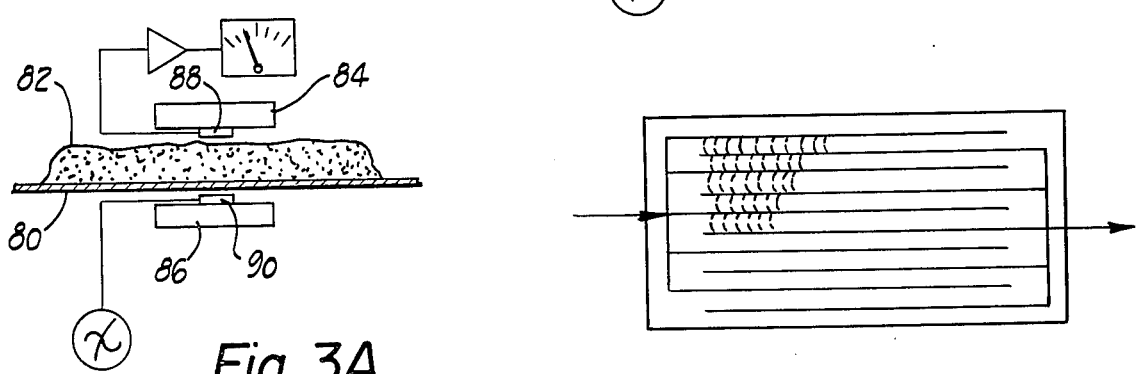
FIG. 3A is an elevation and partial section view of an embodiment of the present invention.

An embodiment of the present invention is illustrated in FIG. 3A. In this embodiment, the moisture probe comprises members 84 and 86 above and below the layer of tobacco 82 on conveyor 80. The conveyor 80 is the same as conveyor 40 in FIG. 2. The members 84 and 86 are provided with driving and driven elements 88 and 90 which establish an electrical field which penetrates the layer of tobacco. The members 84 and 86 and the elements 88 and 90 extend the entire width of the layer of tobacco. The energy transferred from the driving element to the driven element varies with the tobacco moisture content, and as with the embodiment of FIG. 3, changes in the moisture content are appropriately amplified and read in a moisture reading device.

Although the present invention has been described with reference to simply determining the moisture content and weight of tobacco fed to a shipping container, it is obvious that the principles of the present invention are equally applicable to controlling the flow of tobacco to a shipping container. That is, the weight signals can be employed to manually or automatically reverse the direction of movement of the delivery conveyor 26, thus interrupting the flow of tobacco to a shipping container being filled at a predetermined or desired point of loading.

What is claimed is:

1. A tobacco processing and packing apparatus comprising:
    a drying and remoistening chamber;
    a packing tower remote from said drying and remoistening chamber including loading means for loading tobacco into shipping containers;
    conveyor means for transporting tobacco from said drying and remoistening chamber to said packing tower;
    said conveyor means including
    (a) a weigh conveyor for controlling the weight of tobacco fed to a shipping container including means for producing a signal proportionate to the weight of the tobacco thereon, said weigh conveyor being positioned adjacent said packing tower loading means whereby tobacco flowing from the weigh conveyor is transmitted to the shipping containers with minimum delay time; and
    (b) moisture reading means adapted to determine the moisture content of the tobacco on said weigh conveyor simultaneously with determination of the tobacco weight.

2. The apparatus of claim 1 wherein said moisture reading means comprises a probe which extends across the full width of the tobacco layer on the weigh conveyor and is in contact with said tobacco layer, said probe providing an electrical field which extends into the tobacco layer flowing beneath the probe; the energy transmitted by said electrical field being proportional to the moisture content of said tobacco layer.

3. The apparatus of claim 2 wherein said weigh conveyor comprises a balanced beam; a pneumatic weigh cell responsive to said balanced beam producing a pneumatic signal proportional to the weight on said weigh conveyor; converter means for converting said pneumatic signal to an electrical signal; pulser means for converting said electrical signal into a series of pulses; and counter means for counting the number of pulses, said number of pulses being proportional to the weight of the material on said weigh conveyor.

4. In a method for processing tobacco wherein the tobacco is submitted continuously to the successive steps of drying and remoistening at one station, and then packing in a suitable shipping container at a station remote from the drying and remoistening station, the improvement for controlling the weight of tobacco fed to a shipping container comprising continuously producing a signal proportionate to the weight of the tobacco and simultaneously therewith its moisture content immediately prior to introducing the same into said shipping container.

5. The method of claim 4 wherein said determination is used to control the flow of tobacco into a shipping container.

* * * * *

UNITED STATES PATENT AND TRADEMARK OFFICE
CERTIFICATE OF CORRECTION

PATENT NO. : 4,170,251
DATED : October 9, 1979
INVENTOR(S) : Edwin W. Hine, II

It is certified that error appears in the above-identified patent and that said Letters Patent are hereby corrected as shown below:

Column 2, lines 30 and 31, should read --- improved apparatus in which the weight and moisture content readings of the material ----.
Column 3, line 49, after "Fig;" delete "p".

Signed and Sealed this

Twelfth Day of February 1980

[SEAL]

Attest:

SIDNEY A. DIAMOND

Attesting Officer

Commissioner of Patents and Trademarks